H. K. SANDELL.
DYNAMO ELECTRIC MACHINE.
APPLICATION FILED AUG. 8, 1917.

1,381,505.

Patented June 14, 1921.
3 SHEETS—SHEET 1.

Inventor
Henry K. Sandell

Attorneys

H. K. SANDELL.
DYNAMO ELECTRIC MACHINE.
APPLICATION FILED AUG. 8, 1917.

1,381,505.

Patented June 14, 1921.
3 SHEETS—SHEET 2.

Witnesses:

Inventor:
Henry K. Sandell,
By Dyrenforth, Lee, Chritton & Wiles,
Attys.

H. K. SANDELL.
DYNAMO ELECTRIC MACHINE.
APPLICATION FILED AUG. 8, 1917.

1,381,505.

Patented June 14, 1921.

3 SHEETS—SHEET 3.

Witnesses:
Inventor:
Henry K. Sandell,

UNITED STATES PATENT OFFICE.

HENRY K. SANDELL, OF CHICAGO, ILLINOIS, ASSIGNOR TO HERBERT S. MILLS, OF CHICAGO, ILLINOIS.

DYNAMO-ELECTRIC MACHINE.

1,381,505.  Specification of Letters Patent.  Patented June 14, 1921.

Application filed August 8, 1917. Serial No. 185,009.

*To all whom it may concern:*

Be it known that I, HENRY K. SANDELL, a citizen of the United States, residing at Chicago, in the county of Cook and State of Illinois, have invented a new and useful Improvement in Dynamo-Electric Machines, of which the following is a specification.

My invention relates to certain improvements in dynamo-electric machinery.

Some objects of the invention are to improve the construction of alternating current machinery; to provide a type of field in machines of this class wherein the poles are not symmetrically spaced; and to provide means for decreasing hunting comprising in one form a conductive member adjacent the field poles.

Other objects and advantages of the invention will be evident upon reference to the following specification in connection with the accompanying drawings, wherein:—

Figure 1:
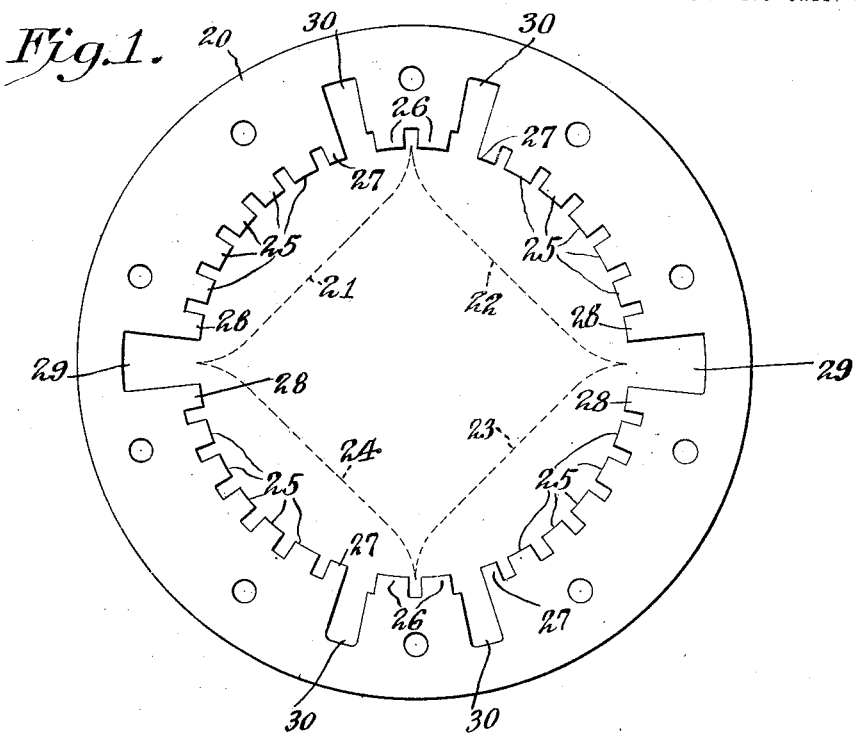
Figure 1A:
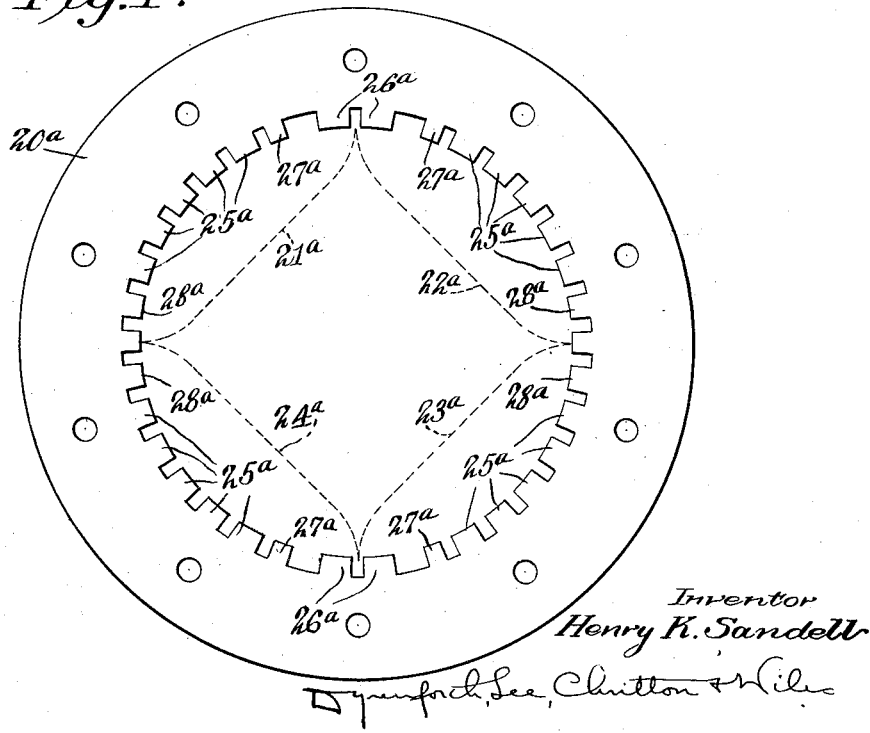
Figure 2:
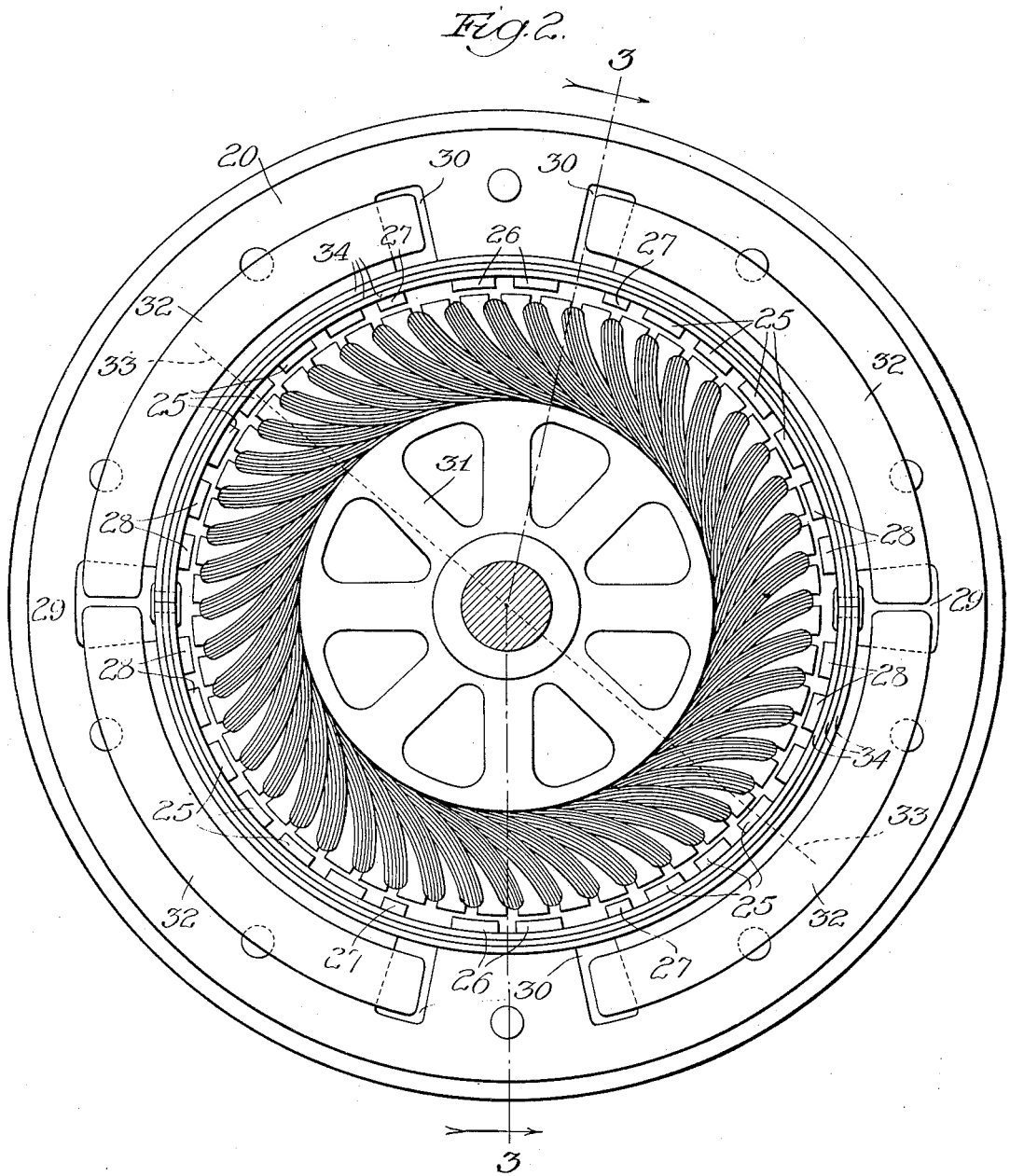
Figure 3:
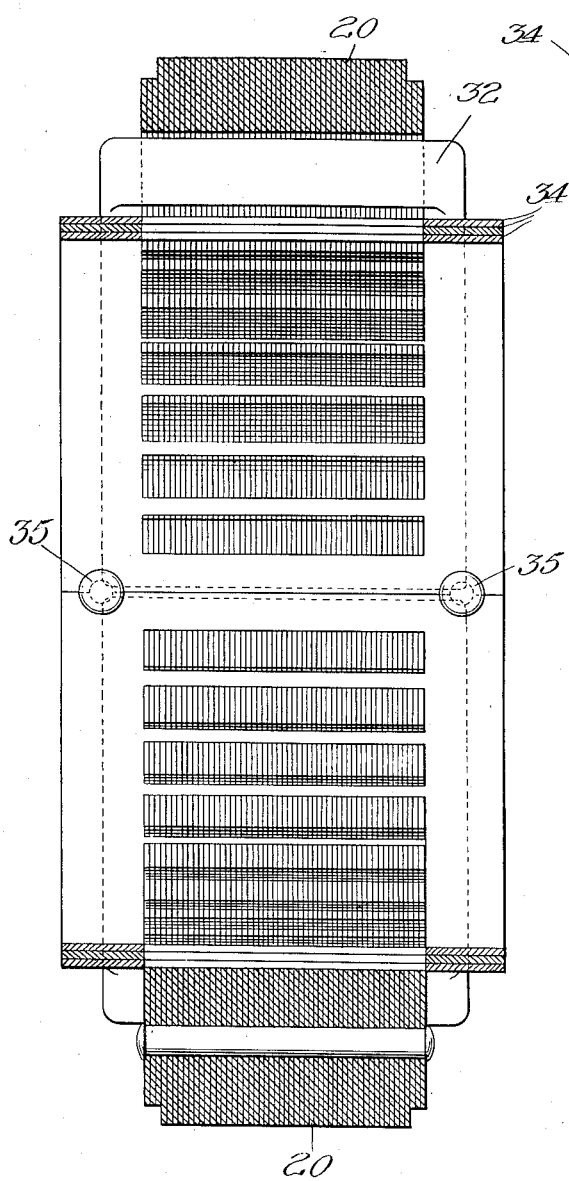
Figure 4:
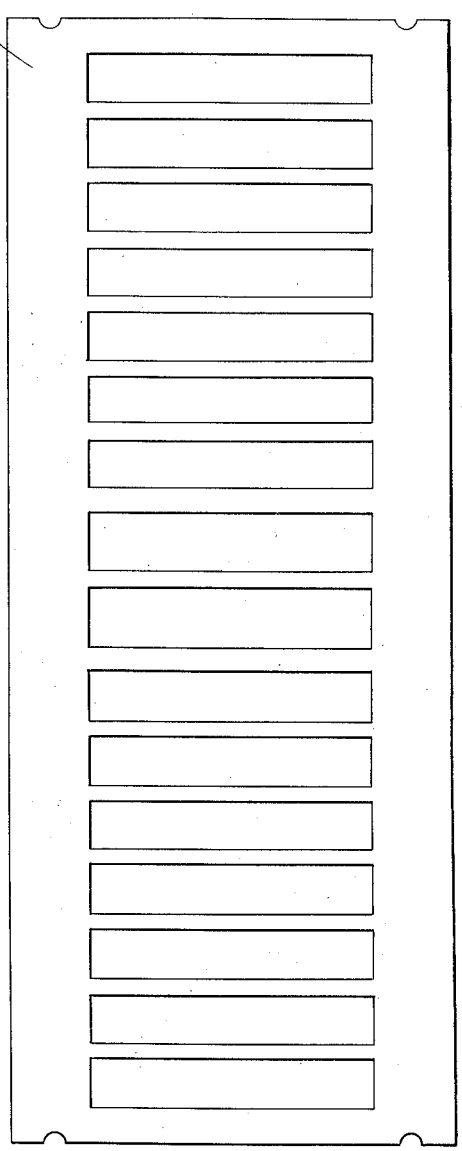

Figure 1 is a face view of one of the laminations of the stator of my dynamo-electric machine. Fig. 1ª is a similar view of a lamination of a stator in accordance with the present invention adapted for use in an induction motor. Fig. 2 is an end view of a lap-wound synchronous motor, the stator of which is made up of laminations of the type shown in Fig. 1. Fig. 3 is a section through the stator on the line 3 of Fig. 2, and showing the manner of applying the squirrel-cage conductors. Fig. 4 is a face view of one of the sheet-copper grids which make up the squirrel-cage conductor.

Referring first to Figs. 1 and 2, I have illustrated a stator, generally designated by the numeral 20, and made up of a plurality of laminations of the form shown in Fig. 1. A peculiar characteristic of these laminations is the design or arrangement of the poles therein by which the machine to which the stators are applied is made capable of starting itself. It has heretofore been proposed to construct self-starting induction motors with an even number of pole pieces in the rotor and an odd number of pole-pieces or teeth in the stator, by which construction it was impossible for the parts to reach a balanced position. I have found that superior results may be obtained by the use of a stator having an even number of pole-teeth, these pole-teeth being arranged in four groups, each group being identical with each of the other groups, but the individual pole-teeth in the groups being of different angular amplitudes. Thus, in Fig. 1 the four groups are designated by the numerals 21 to 24, each group being a counterpart of each of the other groups. The width and spacing of the pole-teeth in the individual groups, however, varies in the manner shown. In this particular arrangement the "normal" pole-teeth are designated by the numerals 25 and constitute the five intermediate poles in each group. Each group also has a pole-tooth 26 at one end wider than the normal pole-teeth and an adjacent pole 27 at the same end narrower than the normal poles. At the other end of each group is a pole 28 narrower than the normal pole-teeth. The slots for the synchronous field-windings are arranged in the manner shown, there being a wide slot 29 adapted to receive the ends of the two winding and formed outside of the end pole 28 of the quadrant group, and a narrow slot 30 adapted to receive the end of one winding and inside of the other end pole-tooth 26 of the group. The stator above described is adapted for use on any synchronous or induction motor. In Fig. 2 I have illustrated a synchronous motor having a lap-wound rotor 31 with an even number (28) of symmetrical pole-teeth coöperating with a stator of the form shown in Fig. 1 and having an even number (32) of individually unsymmetrical pole-teeth arranged in four symmetrical groups as described. The synchronous field-windings of the stator, designated 32, are four in number and arranged in the unsymmetrical fashion shown. As a result of this arrangement of the field windings, the poles are not symmetrically disposed with respect to the median line between opposite poles, as for example the line 33—33 of Fig. 2. The spacing between successive poles varies, being alternately large and small. In the large spacings the unwound stator teeth 26—26 project, separating the poles into groups of two, as illustrated in the specific embodiment of the invention shown in the drawings. The parts are here shown as stopped in a position in which two diametrically opposite poles of the rotor are directly opposite two diametrically opposite poles of the stator. If the pole arrangement were of the usual or symmetrical kind the machine would therefore be balanced about an axis represented by the dotted line 33, and it would be impossible to start the machine by merely connecting the same to the source of single phase A. C. By virtue of the pole arrangement described, however, the machine is not in balance and is capable of starting as an induction motor upon being energized.

The unsymmetrical arrangement of the synchronous field-windings illustrated is particularly advantageous in that it tends to prevent "hunting". By this arrangement the stator poles of the machine are in such angular relationship as to constantly exert a small backward pull upon the rotor, the poles of which are in effect drawn forward against the resistance of this slight backward pull. The corrective effect by which the oscillation or hunting is damped is therefore sensibly greater than is obtainable with the customary spacing of the stator windings.

Fig. 1ª shows the stator structure of Fig. 1 as adapted for use in a straight induction motor. As illustrated, in this form of construction the field winding slots 30 of the construction of Fig. 1 are filled and the field-winding slots 29 replaced by teeth. For use as an induction motor stator the construction therefore comprises two symmetrical groups of pole pieces, one group embracing the two groups 21ª and 24ª, and the other group embracing the two groups 22ª and 23ª.

Referring next to Figs. 3 and 4, there is illustrated a copper grid 34 which may conveniently be formed by stamping sheet-copper into the configuration illustrated, to thereby produce the conductor-bars which make up the squirrel-cage ring. The complete ring is composed of six of these grids, each extending through 180° of the circumference of the stator. The complete ring is therefore composed of three laminations joined by rivets 35, as shown in Fig. 3. The squirrel-cage ring formed in this manner is superior to the ordinary squirrel-cage ring formed by copper pins soldered at their ends in outer conductor-rings, in that the high-resistance soldered joints are eliminated, the ring being in effect integral. At the same time it is of simple and cheap construction and may be readily assembled in the stator.

While I have shown and described in considerable detail one specific embodiment of each of the various features of my invention, it will be understood that this is illustrative only, and for the purpose of making the invention more clear, and that I do not regard the invention as limited to these details nor to any of them, except in so far as such limitations are included within the terms of the accompanying claims, in which it is my intention to claim all novelty inherent in my invention as broadly as is permissible in view of the prior art.

What I claim as new, and desire to secure by Letters Patent, is:

1. In a monophase synchronous motor, a stator comprising a plurality of poles each formed of an equal number of pole-teeth, and unevenly spaced from each other, the successive poles being alternately adjacent and spaced from each other, and additional teeth formed in the stator and projecting in the spaces between the said non-adjacent poles.

2. A stator for an alternating current motor comprising a plurality of pole teeth formed into successive unevenly spaced groups, a winding around each group of teeth, said groups being alternately adjacent and spaced from each other, additional teeth formed in the stator and projecting in the spaces between the said non-adjacent poles, and a conductive grid through which the stator teeth project.

3. In a motor, a stator having a plurality of pole-teeth of unequal angular width and a stationary squirrel-cage embraced thereby through which said pole teeth pass.

4. In a motor, a stator having a plurality of pole-teeth of unequal angular width arranged in a plurality of like groups, a winding for each of said groups and a stationary squirrel-cage embraced by said stator and through which said pole teeth pass.

5. In a motor a stator having a plurality of pole-teeth of unequal angular extents, and a stationary squirrel cage winding disposed with its inductor portions embraced in the spaces between the respective adjacent teeth.

6. In a motor a stator having a plurality of pole-teeth of unequal angular extents, the said pole-teeth being arranged in a plurality of like groups, each group being provided with a winding, and a stationary squirrel cage winding disposed with its inductor portions embraced in the spaces between the respective adjacent teeth.

HENRY K. SANDELL.